June 13, 1950 S. W. SEELEY 2,511,448
ANGLE MODULATION DETECTOR
Filed March 21, 1946
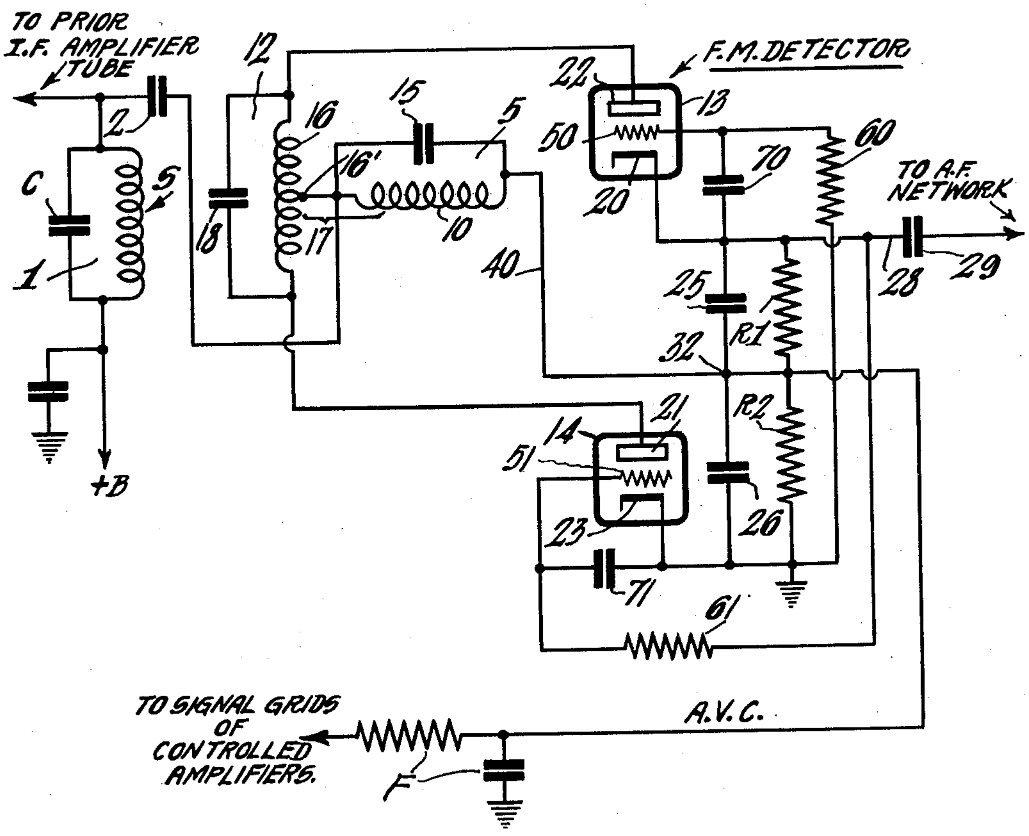
INVENTOR
Stuart W. Seeley
BY H. G. Grover
ATTORNEY Patented June 13, 1950 2,511,448

UNITED STATES PATENT OFFICE 2,511,448

ANGLE MODULATION DETECTOR

Stuart W. Seeley, Roslyn Heights, N. Y., assignor to Radio Corporation of America, a corporation of Delaware Application March 21, 1946, Serial No. 655,989

5 Claims. (Cl. 250—27)

My present invention relates generally to detectors of angle modulated carrier waves, and more particularly to a novel circuit for deriving the modulation signal from a frequency modulated (FM), or phase modulated (PM), carrier wave with minimum noise reproduction.

By "angle modulation" is meant either FM or PM, or hybrid forms of modulation possessing characteristics common to both of them. In the generation, transmission and reception of angle modulated waves undesired amplitude modulation (AM) effects may come from the transmitter directly, may be due to interfering impulses, or may be caused by lack of uniform gain over the signal selector pass band at the receiver.

It is an important object of my present invention to provide a balanced FM detector which tends to keep itself apparently centered on a slowly shifting carrier frequency, such as for example during tuning or drifts in the transmitter or receiver frequencies, but acts as a normal balanced detector for rapid (audio) modulation of the carrier thereby permitting the balanced detector to operate at the center or balance point with reference to the signals with the result that the detector is least sensitive to noise impulses.

Another object of my present invention is to provide a balanced detector composed of a pair of grid-controlled electron discharge devices provided with a common frequency discriminator input circuit, the devices being connected to provide a pair of rectifiers in opposed relation relative to a common output circuit, and the respective control grids being bypassed back to their own cathodes for modulation frequencies, but being cross-connected to opposite cathodes for direct current voltages to provide automatic centering action.

Another object of my invention is to provide a pair of triodes in a balanced FM detector system; the anode to cathode paths of the triodes being connected as opposed diode rectifiers; the control grids riding along in potential with their own respective cathodes for fast changes, as when frequency-representative modulation is applied to the grids, but a negative direct current voltage being applied to the grid of the triode getting the most FM signal in response to the receiver being tuned to one side of center frequency whereby the current outputs of the triodes tend to remain equal.

Another object of my invention is to provide an FM receiver which inhibits AM detection at the side of the center frequency of the desired FM signals and thereby enables the receiver to tune more quietly, the inhibiting action all taking place at the balanced FM detector circuit.

Other objects and features of the invention will best be understood by reference to the following description, taken in connection with the drawing, in which I have indicated diagrammatically a circuit whereby my invention may be carried into effect.

Referring now to the accompanying drawing, there is shown the modulation detector network of an FM receiver of the superheterodyne type. The detector is constructed in accordance with my present invention. While my invention is readily incorporated in any form of receiver of FM waves, I prefer to explain its functioning in connection with a superheterodyne receiver, since such a system is widely used at present. As previously explained, the present invention is not restricted to reception of FM waves, since phase modulated carrier waves would be received as well. An FM wave is produced at the FM transmitter by deviating the carrier wave relative to its mean frequency to an extent proportional to the amplitude of the modulations and independent of the modulating frequency. A PM wave differs in having a frequency deviation which increases with modulating frequency. The generic expression, "angle modulation" is, also, intended to include a modulated wave of preferably constant amplitude wherein the modulation is neither pure FM nor pure PM, but contains components resembling one or both of them, and is, therefore, a hybrid modulation.

In the present application it is assumed, by way of specific example, that the receiver is designed to operate in the presently assigned FM broadcast band of 88 to 108 megacycles (mc.), and that each transmitter radiates an FM wave having a maximum frequency deviation up to ±75 kilocycles (kc.) with respect to the normal transmitter frequency. These are the newly assigned frequency values of the FM broadcast band and are used herein merely by way of illustration. The receiver may include any desired form of signal collector, as for example, a dipole. The collected FM signal waves may be applied to a suitable converter for reduction of the mean frequency value without change of the deviation. The converter may be of any desired construction, and is preferably preceded by one or more stages of selective high frequency amplification. Suitable signal selector circuits, usually employing a variable condenser or adjustable inductor, are employed for adjustment to receive signals from a desired FM station. The signal selector circuits will, of course, preferably be adjusted accurately to resonate the various adjustable selector circuits to the center or mean frequency of the desired FM station.

In a superheterodyne receiver the converter is fed with oscillations from a local oscillator whose tank circuit includes an adjustable reactance device, usually a variable condenser or adjustable inductor. The latter is customarily adjusted concurrently with the aforesaid selector devices so that the tank circuit will be tuned to a local oscillation frequency differing from the desired carrier frequency by the operating intermediate frequency (I. F.). The selective circuits of, and preceding, the converter may on the other hand be of the fixedly tuned type, if desired. The intermediate frequency is usually chosen from a range of 2 to 20 mc., by way of present example 10.7 mc. Any suitable actuating mechanism may be used for operating the station selecting devices. The converter may use the well-known pentagrid tube, or it may use separate oscillator and mixer tubes. These various circuits and circuit components are very well known to those skilled in the art of radio communication, and need only be briefly referred to.

The I. F. amplifier network may embody one or more amplifier tubes selectively tuned to the illustrative operating I. F. value of 10.7 mc. Of course, all signal transmission circuits between the signal collector and the demodulator or detector will be so constructed as to pass efficiently a band at least 150 kc. wide. It is, also, usual to design the signal transmission circuits to have a pass band of approximately 200 kc. in width to provide for reasonable tolerances, such as oscillator frequency drift and the like. The output transformer feeding the final I. F. amplifier tube usually has its primary and secondary circuits each tuned to the operating I. F. value.

One of the reasons in the past for employing an amplitude limiter prior to the discriminator input section (or FM translating network) of the demodulator to reduce undesired AM effects on the carrier wave, was to avoid the necessity for critical tuning to the exact center or carrier frequency of a desired FM wave. In my present system there need be no special amplitude limiter stage employed prior to the detector circuit, since the detector itself is apparently automatically centered relative to the FM signal and tends to be less subject to noise. Hence, the I. F. amplifier tube immediately preceding the detector circuit may possess normal and full gain, which is the reverse of the usual operating condition for an amplitude limiter.

The discriminator input network of my present FM detector comprises coupled primary and secondary circuits denoted by numerals 5 and 12 respectively. The input coil S is indicated as part of the primary circuit. While any known and suitable discriminator may be utilized to provide the energizing signal voltages for detector tubes 13 and 14, I prefer to explain the present circuit action on the basis of the discriminator circuit shown in the drawing. The discriminator input network is generally of the type shown and claimed in my U. S. Patent No. 2,121,103, granted June 21, 1938. In general, it is desired to employ a network constructed and arranged to derive from angle modulated waves a pair of voltages whose relative amplitudes vary in accordance with the angular deviations of the waves with respect to a predetermined reference condition (whether phase or frequency).

Considering the specific illustrative embodiment, primary coil 10 is shunted by condenser 15 to provide a parallel resonant circuit tuned to the operating I. F. The secondary coil 16 is coupled to primary coil 10 as indicated by numeral 17, and coil 16 is shunted by condenser 18. The resonant secondary circuit 12, including coil 16 and condenser 18, is tuned to substantially the resonant frequency of the primary circuit 5. Each of coils 10 and 16 may be of the known inductance trimmer type, or capacity tuning may be used. Specifically, iron cores or slugs may be used for adjusting the inductance values of the respective coils 10 and 16, if coil 16 is so arranged that varying the slug does not unbalance the two halves of the coil. The high alternating potential side of coil 10 is connected by a lead to midpoint 16′ of coil 16 thus establishing the midpoint at the same alternating potential as the high potential side of primary circuit 5. Detectors 13 and 14 are shown, by way of specific example, as electron discharge devices of the triode type. It is to be understood that the triodes may have their electrodes embodied in a common tube envelope.

The coil S may be untuned and located in the +B voltage supply line to the plate of the final I. F. amplifier tube, but preferably I shunt the coil S with a condenser C and tune circuit 1 to the operating I. F. value of circuits 5 and 12. The high alternating potential side of coil S is coupled by direct current blocking condenser 2 to the midpoint 16′. The magnitude of condenser 2 is so chosen as to provide maximum transfer of I. F. signal energy from circuit 1 to primary circuit 5. The tuned circuit 1 in combination with circuit 5 functions as an impedance matching device for coupling the high impedance source of I. F. signals to the relatively low input impedance of the detector. It is to be understood that circuit 1 may be eliminated, and circuit 5 located in the I. F. amplifier plate circuit.

The triodes 13 and 14 have the respective anode to cathode paths thereof connected to act as diode rectifiers. Thus anode or plate 22 of triode 13 is connected to the upper end of coil 16, while anode 21 is connected to the lower end of the coil. Cathodes 20 and 23 are respectively connected to the upper end and grounded end of load resistors $R_1$ and $R_2$. Condensers 25 and 26 bypass the respective resistors $R_1$ and $R_2$ for I. F. currents. The low potential side of primary circuit 5 is connected by lead 40 to the junction 32 of I. F. bypass condensers 25 and 26.

Automatic volume control (AVC) bias may be taken off from point 32, and utilized in known manner. The lead designated "AVC" may be connected to the signal grids of controlled radio frequency and I. F. amplifier tubes, the AVC lead including a suitable filter network F.

The control grids 50 and 51 are connected into the output circuit to perform desired functions. Thus, grid 50 is connected by a resistance 60 to the grounded end of load resistor $R_2$. The grid 50, however, is connected by condenser 70 having a very low impedance for audio frequencies to its cathode 20. In the same way the grid 51 is connected to its cathode 23 by audio frequency bypass condenser 71. The grid 51 is, moreover, connected by the high resistance 61 to the cathode end of load resistor $R_1$. Merely by way of illustration, and in no way restrictive, the following values may be employed for the circuit elements:

$$R_1 = R_2 = 100{,}000 \text{ to } 250{,}000 \text{ ohms}$$
$$R_{60} = R_{61} = 1 \text{ megohm}$$

Condensers 70 and 71 in conjunction with their respective resistors 60 and 61 should have a time constant which is long compared to the lowest audio frequency to be produced, say 0.2 second. Condensers 25 and 26 act only as radio frequency bypass condensers, and may be of the order of 100 micro-microfarads.

It can be seen that the diodes 22, 20 and 21, 23 are arranged in opposed relation as in a conventional FM detector circuit of the type employing balanced diodes. The modulation voltage, in this case the desired audio frequency modulation signal voltage, is taken off by connecting lead 28 to the upper end of load resistor $R_1$. Condenser 29 is an audio frequency coupling condenser, and is inserted in the lead 28 to the input grid of the following audio frequency amplifier tube (not shown). Of course, one or more audio amplifier tubes may be employed, and the amplified audio frequency signals may be reproduced in any suitable manner, as by a loud speaker.

Before describing the electrical relations existing in the present FM detector circuit, there will generally be explained the manner in which the discriminator input network of the detector functions, reference specifically being made to my aforesaid patent. It is first assumed that the FM signals applied to the primary circuit 5 are instantaneously at the mean or carrier frequency of 10.7 mc. The primary signal energies applied to the two diodes 22, 20 and 21, 23 will be of like phase. However, anode 22 and anode 21 are connected to opposite ends of secondary coil 16. Due to the coupling 17 between tuned circuits 5 and 12 there will be a 90 degree phase shift between the primary and the secondary circuit voltages, when the instantaneous carrier frequency at coil S is at the resonant or center frequency value.

Accordingly, the secondary signal voltage will be applied to anode 22 and anode 21 from the respective ends of coil 16 in opposite phase, but in each case in phase quadrature with the primary signal voltage. It follows, therefore, that the resultant signal voltages applied to anode 22 and anode 21 will be equal at the carrier frequency, and the rectified voltages across resistor $R_1$ and $R_2$ will be of equal magnitude.

If, at some later instant, the FM signals at circuit 1 have a frequency different from the resonant frequency of circuit 12, there will occur a phase shift of the signal energy transmitted through the transformer 10, 16 which is greater or less than 90 degrees, depending on the direction and the extent of frequency difference between the instantaneous frequency of the FM signals and the predetermined resonant frequency of the tuned circuits 5 and 12. This means that there will be applied to the diodes 22, 20 and 21, 23 resultant signal voltages of different magnitudes, and, therefore, the rectified voltages across respective loads $R_1$ and $R_2$ will be of different magnitudes.

It will now be appreciated that the detector tubes function to provide balanced FM detection in accordance with my aforesaid patent. By connecting each control grid to its respective cathode for audio frequency variations, and to the cathode of the opposite triode for direct current voltage variations, desirable characteristics are secured. If, for example, the receiver is mistuned from center frequency so that there tends to be more current flow through one diode 22, 20 than the other diode 21, 23, there will be a negative grid bias applied to the triode whose anode receives the larger vector sum voltage. Hence, that particular triode will have its rectification efficiency substantially reduced thereby causing equalization of the output currents of the opposed tubes.

For fast changes, as for frequency-representative modulation, the grids 50 and 51 literally "ride along" with their own respective cathodes

20 and 23, because of the audio bypass condensers 70 and 71. The reason for connecting the grids to respective cathodes, then, for audio currents is to prevent the automatic centering mechanism from following the audio modulation. Hence, for the modulation voltage variations each grid and associated cathode act as a common electrode. However, if the FM receiver is tuned to one side of the desired FM carrier, or station, frequency, as when tuning through a channel or when the receiver is mistuned or detuned, a predetermined one of the grids will have its bias varied to an extent and in a sense to cause the current flow through each of resistors $R_1$ and $R_2$ to be equal.

For example, assume a greater value of signal voltage is applied to tube 13 due to mistuning of the receiver. This will cause the current flow through load resistor $R_1$ to exceed that through $R_2$. Hence, optimum detection efficiency will not exist, because the applied FM signals are not centered on the predetermined reference or center frequency of 10.7 mc. Noise will readily become apparent in such case, because balanced detectors of this type are least sensitive to noise impulses when they are accurately centered. Since, however, grid 50 is grounded through high resistance 60, which suppresses fast voltage variations, the cathode 20 will become positive and thereby effectively increase the negative bias of grid 50. This will tend to reduce the efficiency of rectification of rectifier 22, 20 thereby equalizing the current flow through resistors $R_1$ and $R_2$.

Conversely, greater signal voltage applied to tube 14, in response to opposite mistuning, will cause the voltage drop across resistor $R_2$ to be larger. This will result in the grid 51 becoming more negative relative to grounded cathode 23. Hence, the rectification efficiency of diode 21, 23 will be reduced to such an extent that the output currents through resistors $R_1$ and $R_2$ are equalized. There is, therefore, provided automatic control of rectification efficiency to maintain the detector output current balanced. The triodes are, in effect, variable efficiency resistors, the efficiency being automatically adjusted by virtue of the balancing action of the cross-connecting grids so as to keep the detector outputs balanced even though the input signal is not accurately centered. There is provided an apparent self-centering action in the detector circuit.

While I have indicated and described a system for carrying my invention into effect, it will be apparent to one skilled in the art that my invention is by no means limited to the particular organization shown and described, but that many modifications may be made without departing from the scope of my invention.

What I claim is:

1. In combination, a source of frequency modulation signals, a discriminator input circuit therefor, a pair of triode rectifiers, means connecting the anode of one rectifier and anode of the second rectifier to predetermined points of said discriminator input circuit, a separate condenser of low impedance to modulation frequency currents connecting the grid and cathode of each one of the triode rectifiers, a pair of series-connected load resistors connected between the cathodes, said discriminator circuit having a connection from a point between said predetermined points to the junction of said pair of resistors, means for deriving modulation voltage from across said pair of resistors, and a direct current voltage cross-connection from each rectifier grid to the cathode of the opposite rectifier, thereby to control the impedance represented by said triode rectifiers.

2. In combination with a source of frequency modulated carrier waves, means for deriving from the waves a pair of signal voltages whose relative magnitudes are dependent upon the frequency modulation of the waves, at least two triode rectifiers, means for applying each of said pair of voltages to a respective triode plate, a pair of by-passed load resistors connected in series between the triode cathodes, means deriving audio voltage from across the resistors, means establishing the grid and cathode of each triode at a common audio potential, and separate cross-connections for applying the direct current voltage across said resistors to the respective grids of the triode rectifiers to control the space current therethrough.

3. In combination with a source of angle modulated carrier waves, means for deriving from the waves a pair of signal voltages whose relative magnitudes are dependent upon the angular modulations of the waves, at least two triode rectifiers, means for applying each of said pair of voltages to an anode of each respective triode, means establishing the grid and cathode of each triode at a common potential for modulation frequencies, means for deriving modulation voltage from across series-connected load resistors connected between the triode cathodes, independent direct current voltage cross-connections between the grid of each triode and the cathode of the second triode, thereby to control the impedance represented by said triode rectifiers, and means for deriving from the junction of the load resistors a rectified voltage responsive to wave amplitude variation.

4. In combination, a source of frequency modulation signals, a pair of triode rectifiers, a frequency discriminator input circuit, means connecting the anode of one rectifier and anode of the second to predetermined points of said discriminator, a condenser of low impedance to modulation frequency currents connecting the grid and cathode of each one of the triode rectifiers, a pair of load resistors connected serially between the cathodes, said discriminator having a connection from a point intermediate said predetermined points to the junction of said pair of resistors, separate direct cross-connections between each grid and the cathode of the opposite triode, thereby to control the impedance represented by said triode rectifiers and means for deriving modulation voltage from across said pair of resistors.

5. In combination with a source of angle modulated carrier waves, means for deriving from the waves a pair of signal voltages whose relative magnitudes are dependent upon the angular modulations of the waves, at least two triode rectifiers, means for applying each of said pair of voltages to a respective triode rectifier, a pair of bypassed load resistors connected in series between the triode cathodes, means deriving modulation voltage from across the resistors, means establishing the grid and cathode of each triode at a common modulation potential, and separate cross-connections from each grid to the cathode of the opposite triode for applying the direct current voltage across said resistors to the respective grids of the triode rectifiers to control the ratio of the average space current through said triode rectifiers.

STUART W. SEELEY.

REFERENCES CITED

The following references are of record in the file of this patent:

UNITED STATES PATENTS

| Number | Name | Date |
|---|---|---|
| 2,282,910 | Thompson | May 12, 1942 |
| 2,316,317 | Curtis | Apr. 13, 1943 |
| 2,413,593 | Sziklai | Dec. 31, 1946 |